United States Patent
Rous et al.

(10) Patent No.: US 6,516,126 B1
(45) Date of Patent: Feb. 4, 2003

(54) ELEMENT WITH EXTRUDED SHEATHING

(75) Inventors: Friedemann Rous, Bayreuth (DE); Alfred Mehl, Georgensmünd (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/511,981

(22) Filed: Feb. 24, 2000

(30) Foreign Application Priority Data

Feb. 25, 1999 (DE) .......................... 199 08 110

(51) Int. Cl.⁷ .................................. G02B 6/02
(52) U.S. Cl. ......................................... 385/128
(58) Field of Search ...................... 264/419, 449; 385/128, 147

(56) References Cited

U.S. PATENT DOCUMENTS

| | | | |
|---|---|---|---|
| 3,824,052 A | * 7/1974 | Fowler | 425/83 |
| 4,664,472 A | 5/1987 | Mayr et al. | |
| 4,691,896 A | * 9/1987 | Reeve et al. | 254/134.4 |
| 4,900,126 A | * 2/1990 | Jackson et al. | 385/114 |
| 5,007,706 A | * 4/1991 | Parker et al. | 428/394 |
| 5,067,831 A | * 11/1991 | Robbins et al. | 385/123 |

FOREIGN PATENT DOCUMENTS

| | | | |
|---|---|---|---|
| DE | 1 914 478 | 1/1970 | |
| DE | 25 13 722 B2 | 9/1976 | |
| DE | 32 12 212 C2 | 11/1982 | |
| DE | 37 04 053 C2 | 8/1988 | |
| DE | 38 26 626 C2 | 2/1990 | |
| DE | 4038827 A1 | * 6/1992 | |
| DE | 4038827 A | * 6/1992 | 385/123 |
| DE | 40 38 827 A1 | 6/1992 | |
| EP | 0 307 164 B1 | 3/1989 | |
| EP | 0 336 806 A | 10/1989 | |
| EP | 0 757 265 A | 2/1997 | |
| EP | 0757265 A | * 2/1997 | 385/128 |
| GB | G 92 09 018.4 A | 12/1992 | |
| WO | WO 98/44050 | 10/1998 | |
| WO | WO98/445050 | * 10/1998 | 385/128 |

OTHER PUBLICATIONS

Mahlke, Guntherm; Gossing, Peter: "Lichtwellenleiter–Kabel", Siemens AG, 1992, Auflag 3, 1992, p. 98.

* cited by examiner

*Primary Examiner*—Akm E. Ullah
(74) *Attorney, Agent, or Firm*—Sughrue Mion, PLLC

(57) ABSTRACT

A cable wherein the sheathing contains at least two polymers, the adhesion capability of which is low when extruded in layers on to each other, and the sheathing has at least two adjacent layers, with the polymeric material of one layer being exclusively or predominantly the first polymer and the second layer including a mixture of both polymers.

11 Claims, 1 Drawing Sheet

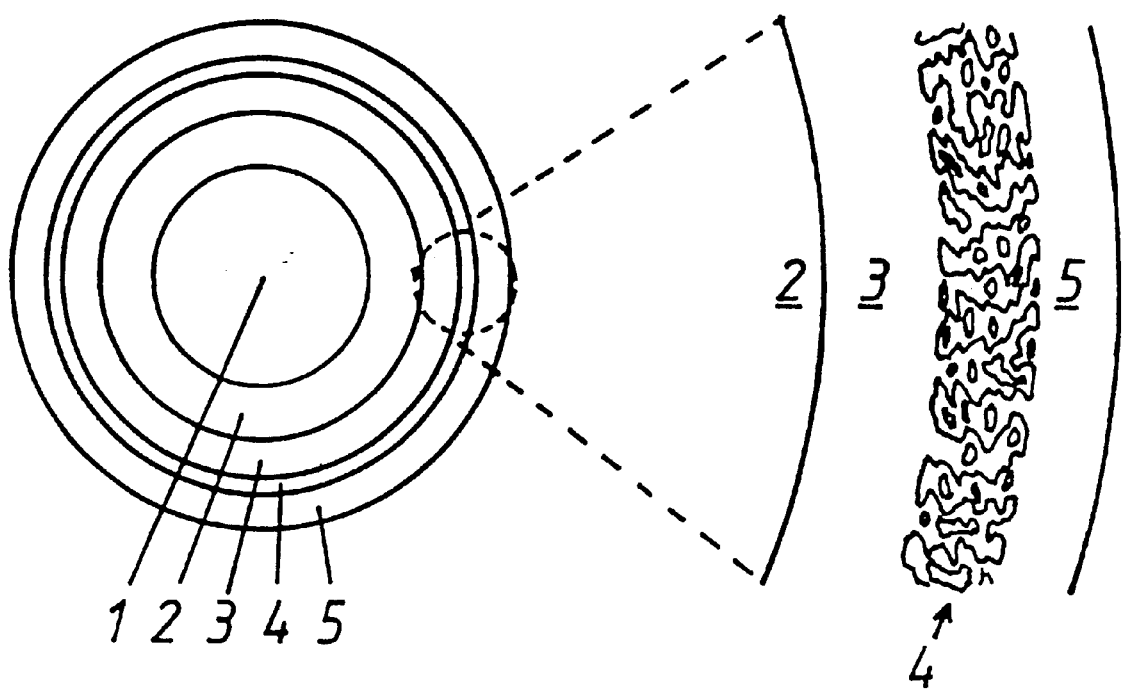

ELEMENT WITH EXTRUDED SHEATHING

This application is based on and claims the benefit of German Patent Application No. 199 08 110.7 filed Feb. 25, 1999, which is incorporated by reference herein.

BACKGROUND OF THE INVENTION

The invention concerns an elongated, flexible element with a core element for energy and/or data transmission and an extruded polymeric sheathing which encloses the core element.

Among other things, polymeric optical fibers, which are composed, for example, of polymethyl methacrylate (PMMA) and/or fluorinated PMMA, are used in vehicles or in mechanical engineering since they are mechanically rugged and easy to handle. They comprise a core with cladding for conducting light. As protection from extraneous light and damage by external influences, the fibers are also provided with an exterior sheathing. The sheathing as a rule is extruded onto the surface of the fiber. Because of the areas of application, the sheathing should not only prevent mechanical damage to and incidence of light into the fiber, but should also provide protection against humidity, chemicals, in particular oils and greases, and thermal stress and, if appropriate, should be flameproof.

In order for the optical transmission of the fibers not to be impaired through mechanical stresses, the material of sheathing must be of low shrinkage. For this reason it is proposed in the utility model DE 92 09 018 that shielding of polyamide, polyurethane or polyoxymethylene (POM) be used in place of shielding of polyethylene (PE), polypropylene (PP), chloridized polyethylene or polyvinyl chloride (PVC). However, it is a drawback that these materials only fulfill a portion of the necessary requirements, while their cost is relatively high, e.g., in relation to polyolefins. Also in many cable types for specific areas of application, for example, drag cables for robots, there is a demand for sheathing with suitable combinations of different features.

SUMMARY OF THE INVENTION

Against this background, the object of the invention is to develop a sheathing for elongated components that fulfils in a cost effective manner a combination of chemical and mechanical requirements.

This object of the invention is achieved by a cable wherein the sheathing contains at least two polymers, the adhesion capability of which is low when extruded in layers on to each other, the sheathing has at least two adjacent layers, whereas the polymeric material of one layer exclusively or predominantly is the first polymer and the second layer includes a mixture of both polymers.

A fundamental idea of the invention is that the required features of sheathing can be realized through a combination of layers of different materials. The interior side of the sheathing facing the core element is advantageously formed by a comparably hard plastic which provides mechanical protection for the core element. In contrast, the external surface is a soft, preferably chemically resistant plastic. The combination of a flameproof interior layer with a mechanically strong surface is also advantageous. A soft interior layer is suitable as a buffer layer between the core element and a harder external layer. The sheathing can be produced so as to be cost effective and to have low shrinkage through optimization of layer thicknesses. It is possible to provide three or more layers in order to achieve the desired features.

However, suitable combinations of polymers have the disadvantage that the adhesion capability of layers of the pure materials extruded on each other is small. Accordingly no sufficient material bond is realized, so that the sheathing cannot be easily removed and its resistance to mechanical stress is reduced. This is in particular true if layers of polar plastics, for instance polyurethane, are combined with non-polar plastics such as polypropylene, for example. Also in the case of combination of different polar plastics, for example such as polyurethane and polyoxymethylene, or of different non-polar plastics as a result of the necessary processing parameters, such as the extrusion temperature, sufficient adhesion of the layers is often not achievable.

In the sheathing according to the invention, a first polymer forms exclusively or at least one-half of the polymeric material of a layer. To realize a strong layer bond, it is proposed that in a bordering layer of the sheathing, a mixture of the first polymer with the second be present. The proportion of the first polymer of the mixture is considerably smaller than in the first layer and it forms one-half or one-third of the polymeric material of this layer for example. The proportion of the first polymer in both adjoining layers results in good adhesion and therefore a strong bond. In contrast, the features of the layers differ considerably from the proportion of the first polymer. If the sheathing consists of three or more layers, several layers are possible with mixtures of this kind. The first polymer in turn can be a mixture of chemically related materials, for instance PP and EPDM; the same applies to the second polymer.

The sheathing is produced through extrusion. It is carried out advantageously in a step in which at least two materials are brought into an extrusion head in order to optimize the bonding of the layers, for example through crosshead extrusion. It is also conceivable to manufacture the sheathing in several successive steps, such as through tandem extrusion.

On account of the strong bonding of materials, the sheathing according to the invention can easily be removed, for example for fabrication of the element. It can be produced to be mechanically strong, resistant to stress-cracking, and low shrinking. Good chemical resistance, in particular against oils and greases, as well as low absorption of moisture can be also achieved. Finally, sheathing with high flexibility at low temperatures and good resistance to heat can be produced. It is particularly well suited for use in the construction of machines and of vehicles, such as in the manufacture of automobiles, ships or aircraft.

In a useful rendering of the invention, the mixture of the two polymers contains a compatibility agent, e.g., a maleic anhydride-containing copolymer. The compatibility agent prevents a separation of the mixture in the melted state into different phases. Consequently, the production and handling of the mixture, in particular of polar and non-polar polymers, is simplified.

In order to optimize specific features of a layer, it can contain a pure polymer. However, it is often advantageous for both adjoining layers to contain a mixture of the first and second polymers. In this way, good adhesion can be achieved with a relatively small addition of, e.g., 20% of the other polymer.

The layers of sheathing preferably transition into each other without a sharp boundary surface, such as through the use of an extrusion process which causes the melting of the edges of the materials. A continuous transition of the material of the interior surface into the material of the external surface of the sheathing without the formation of defined layers is particularly advantageous.

A useful configuration of sheathing consists in its external or interior layer being a mixture with a polymer of a bordering layer. It is possible this way to build up the sheathing from only two layers.

Alternatively the polymer mixture according to the invention and/or the copolymer in an at least three-layered sheathing forms a bond-producing layer between two bordering layers, with the polymer portion of the first layer being composed predominantly of the first and that of the second layer being composed predominately of the second polymer. Consequently, in a three-layered sheathing the bond-producing layer thus contains a mixture of the materials of its two surfaces.

The sheathing is suitable in particular for the protection of polymeric optical fibers. Alternatively, it is suitable as insulation or cladding of electrical cables and lines for specific applications, in particular for drag cables, like those used with industrial robots. In the latter case, the sheathing is advantageously extruded onto the line shield or a wrapping of the cable core.

Advantageous materials for the interior surface of sheathing include polyacetates, in particular polyoxymethylenes, polyolefins or polyesters. In addition, mixtures and copolymers of these materials with each other and with other materials are possible. Useful polyolefins are, in particular, polypropylene as well as copolymers and mixtures of polypropylene, e.g., with EPDM (ethylene propylene dialkene terpolymer). Good flame resistance in case of fire can be achieved by the use of polyetherimide with silicone as a copolymer.

Preferred materials for the external surface of sheathing are specifically thermoplastic polyurethane (TPU), polyamides, polyetherimides or polyesters. Also in this case mixtures and copolymers with each other and with other plastics are possible.

Additives, fillers, and processing materials can be added to the plastics of the sheathing depending on the application. By way of example, plastics filled with chalk and/or talcum powder, e.g., polyurethane are suitable. For applications with the risk of fire, plastics which contain a flame-retardant, for example, melamine cyanogen urate, ammonium polyphosphates, or a mixture thereof are useful. Also, flame protection systems which contain metal hydroxides and/or carbonates and silicon oil and/or resin as well as metal-organic salt with a bivalent metal, such as magnesium stearate, are suitable. Furthermore, halogen-containing flame retardants are possible. For improvement of the features of plastics, cross-linking is conceivable, in particular, irradiation cross-linking.

BRIEF DESCRIPTION OF THE DRAWINGS

In the following description section, exemplary embodiments of the invention are explained in greater detail. The drawing shows a schematic cross section through the sheathing of an element as maintained by the invention.

The core element of the component is formed by a polymeric optical fiber which is built up from a light-conducting core (1) and a cladding (2). A sheathing which consists of three layers (3–5) is extruded onto the outer surface of cladding (2). Interior and external layers (3,5) consist of plastics in combination with each other optimize the mechanical, thermal and chemical features of sheathing. The middle layer (4) forms a bond-forming layer which causes a firm bond of the sheathing. As the cross-sectional enlargement shows, the bond-forming layer is a mixture of two different materials which are identical with those of the bordering layers (3,5). Therefore, with appropriate management of the process, no defined boundary but rather a continuous transition is formed between layers (3–5). The thickness of the layers can differ depending on the requirements of the sheathing; a relatively thick interior layer (3) which in particular generates mechanical protection for the fiber can be encircled, e.g., by thinner layers (4,5) to provide adhesion and chemical protection.

The following table describes useful combinations of materials for sheathing. Pure materials are suitable for the external and interior layer; however, addition of filling materials is also conceivable, for instance, chalk in the case of TPU. Omission dashes in the middle column indicate sheathing of only two layers.

| Interior layer | Intermediate layer | External layer |
| --- | --- | --- |
| POM | POM-TPU mixture | TPU |
| POM-TPU mixture | — | TPU |
| POM | POM polyamide mixture | Polyamide |
| PP | PP-TPU mixture | TPU |
| Polyester | Polyester TPU mixture | TPU |
| Polyester | Polyester polyamide mixture | Polyamide |
| PP-TPU mixture | — | TPU |
| PP-TPU mixture | — | TPU-PP mixture |
| Polyetherimide copolymer-polyester mixture | — | Polyester |
| Polyetherimide copolymer-polyester mixture | — | Polyetherimide copolymer |

Suitable mixture proportions for the intermediate layer are between 20:80 and 80:20 percent by weight of the material of the external layer to the material of the interior layer. In these cases, a ratio of material of the external material of the outer layer to that of the inner layer in the range of 50:50 up to 70:30 is preferred. If the external or interior layer is formed of a mixture, the mixture proportions preferably deviate considerably from 50:50 and may, for example, be 80:20 percent by weight in order to achieve well defined features. Mixtures of polar and non-polar polymers preferably contain a compatibility agent, a copolymer containing maleic anhydride, for example.

In this manner, elements with a cost effective, easily removed sheathing are obtained, which have advantageous mechanical, thermal, and chemical properties.

EXAMPLE 1

As a interior layer, a mixture of 80% by weight acetal copolymer and 20% thermoplastic polyether urethane elastomer was produced and was applied with a commercially available extruder onto the surface of a polymeric optical fiber. In this case, an acetal copolymer of trioxane with small fractions of comonomers was used which has a high degree of crystallinity and a melting index MFR of 2.5 dg/min (at 190° C. and 2.16 kg of load). The polyether urethane elastomer had a Shore A hardness of 87 and a melting index MFR of 40±10 dg/min (190° C., 21.6 kg). Onto the interior layer, a second layer was extruded which consisted 100% of the polyether urethane elastomer which was added to the material of the interior layer.

EXAMPLE 2

A layer of 100% acetal copolymer was extruded onto a polymeric optical fiber. As an intermediate layer, a mixture of 50% by weight acetal copolymer and 50% by weight polyether urethane elastomer was then applied in a further extrusion process. A third layer of 100% polyetherurethane elastomer was extruded on top of this. The polymers used corresponded to those of example 1.

EXAMPLE 3

A layer of 100% polypropylene copolymer with elastomer fractions, which has a Shore D hardness of 30 and a melting index MFR of 0.6 dg/min (230° C., 2.16 kg), was extruded onto a polymeric optical fiber. As an intermediate layer, a mixture of 30% by weight of the PP copolymer of the first layer, 68% by weight of thermoplastic polyether urethane elastomer and as a compatibility agent, 2% by weight LLDPE with grafted maleic anhydride was applied in a further extrusion process. The polyether urethane elastomer had a Shore A hardness of 80 and a melting index MFR 40±10 dg/min (190° C., 21.6 kg). A third layer of 100% of the polyether urethane elastomer used in example 1 was extruded over it.

The sheathings produced in accordance with the aforementioned examples are easily removed from the optical fiber, mechanically strong, resistant to stress cracks, low-shrinking, and suitable for use in a temperature range between 40° C. and 90° C. They are resistant to oils and greases and are distinguished by a low degree of moisture absorption.

What is claimed is:

1. An elongated flexible element with a core element for energy and/or data transmission and an extruded sheathing which encloses the core element, wherein the sheathing comprises three adjacent polymer layers (3, 4, 5), with an inner polymer layer (3) being exclusively or predominantly a first polymer and an outer polymer layer (5) being exclusively or predominantly a second polymer, where the adhesion capability of the first and the second polymer is small in the case of extrusion by layers one on top of the other whereby for improving the adhesion between the inner and the outer layer the layer between the inner and the outer layer comprises a mixture of said first polymer and the second polymer.

2. An element according to claim 1, wherein the mixture of both first and second polymers contains a compatibility agent.

3. An element according to claim 1, wherein both first and second layers contain a mixture of both first and second polymers.

4. An element according to claim 1, wherein all of the layers transition continuously with each other.

5. An element according to claim 1, wherein the second layer forms a surface of the sheathing.

6. An element according to claim 1, wherein the middle layer forms an adhesive layer between said first layer in which the polymer material is exclusively or predominantly the first polymer and said second layer in which the polymer material is predominately the second polymer.

7. An element according to claim 1, wherein the core element is a polymeric optical fiber.

8. An element according to claim 1, wherein the sheathing is the insulation or the cladding of a cable.

9. An element according to claim 1, wherein the interior surface of sheathing contains a polyolefin, a polyester, a polyetherimide copolymer or a polyacetal.

10. An element according to claim 1, wherein the external surface of sheathing contains a polyurethane, a polyester, a polyamide or a polyetherimide copolymer.

11. An element according to claim 1, wherein at least one of the first and second polymers contain at least one of a filling material and a flame-retardant.

* * * * *